United States Patent Office 3,430,120
Patented Feb. 25, 1969

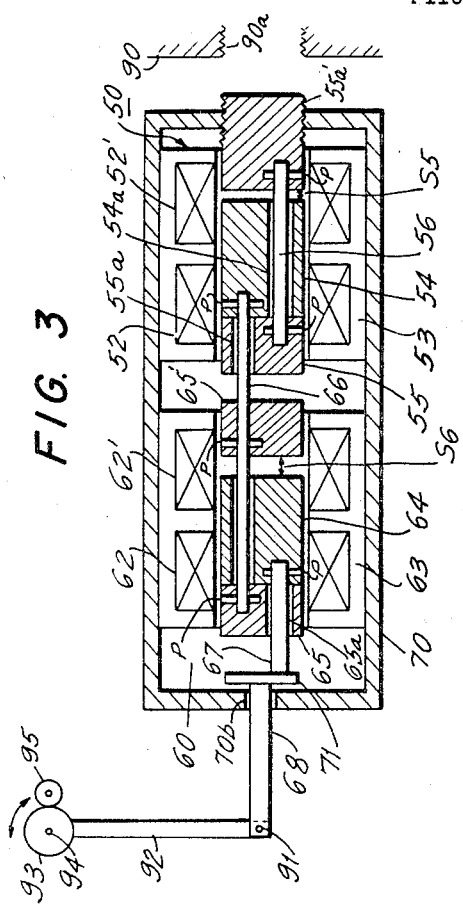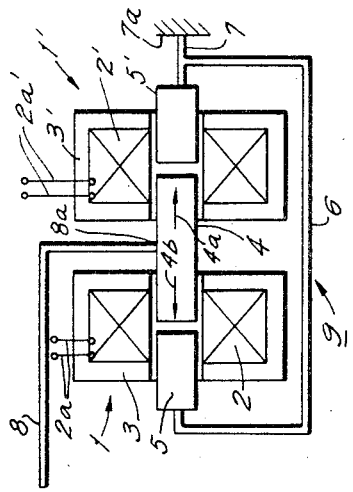

3,430,120
ELECTROMAGNETIC POSITIONING MECHANISM
Yasukuni Kotaka, Takeshi Arakawa, and Takemi Kamata, Tokyo-to, Japan, assignors to Nippon Electric Company Limited, Tokyo, Japan
Filed July 18, 1966, Ser. No. 565,999
Claims priority, application Japan, July 24, 1965, 40/44,665
U.S. Cl. 318—135
Int. Cl. H02p 1/40; H02k 41/02
12 Claims The instant invention relates to positioning mechanisms, and more particularly to electromagnetic positioning mechanisms uniquely adapted for converting binary-coded electrical input signals into lineal or rotational movement of an output shaft permitting the output shaft to assume a plurality of discrete positions over a range of positions from zero to maximum deflection, depending only upon the binary input information presented to the device.

There exists the need in many different industrial fields, for example, to provide a device which will convert binary information into decimal information, for example, in order to perform subsequent operations as a result of such a binary-to-decimal conversion. For example, it may be desired to linearly or rotationally move a device or shaft through a predetermined number of lineal displacement units or angular degrees as a result of a computation which has been performed by a binary device such as a computer. As one example, let it be assumed that a computer is programmed to manipulate a machine tool in order to produce a predetermined product. The machine tool is thereby placed under the control of a digital-type computer machine. The computing machine sequentially operates the machine tool through a variety of operations in order to produce the desired product. Certain of these operations may require the rotation of a shaft through a predetermined number of angular degrees, or may require the lineal displacement of a member through a predetermined number of displacement units. In order to effect this result, conventional devices require a digital-to-analog conversion in order to produce an analog voltage representative of the digital input information. This analog information is then imposed upon the machine in order to displace or rotate the component which it is desired to control.

The instant invention is characterized by providing a positioning mechanism which is directly adapted to accept input signals in digital form and immediately and automatically convert the input signals into a lineal or rotational displacement without the need for providing such digital-to-analog devices as are required in accordance with conventional techniques.

In order to achieve the desired objective, the instant invention is provided with a pair of plunger-type electromagnets to form a dual electromagnet structure. The pair of windings of the electromagnet structure are adapted to receive information in digital form in order to displace the plunger elements in either a first or a second direction wherein said second direction is opposite to said first direction. By providing a plurality of such digital actuator elements arranged in cascade fashion, the output shaft of the device may then assume any one of a number of discrete displacement positions within the range of a predetermined full stroke distance. For example, providing two of such digital actuator elements enables a total displacement of from zero to three lineal displacement movements; providing three such digital actuator elements provides a total displacement of from zero to seven lineal displacement units; and so forth.

By arranging the digital actuator elements so that the plunger units are always within the maximum field strength region of the electromagnets, it is possible to obtain substantially instantaneous operation, thereby enabling the positioning mechanism to accept digital information in either a serial (sequential) or parallel (simultaneous) fashion, depending only upon the needs of the user. By pivotally coupling the linearly movable output shaft of the positioning mechanism to a rotational output shaft, the lineal displacement may be automatically and instantaneously converted into an angular displacement, if desired.

It is, therefore, one primary object of the instant invention to provide a novel electromagnetic positioning mechanism for producing rapid lineal discrete displacements of an output shaft in response to binary-coded electrical input signals applied to the positioner after digital computations have been performed on an electromagnetic basis.

Another object of the instant invention is to provide a noval positioning mechanism for substantially instantaneously converting digital input information into either a lineal or an angular displacement without the need for employing conventional digital-to-analog converting devices.

Another object of the instant invention is to provide a novel positioning mechanism for substantially instantaneously converting input information in the form of digital signals into a lineal or angular displacement by means of cascading a plurality of plunger type electromagnetic pairs enabling the positioning mechanism to assume a plurality of discrete displacement positions under control of discrete digital signals.

These and other objects of the instant invention will become apparent when reading the accompanying description and drawings in which:

FIGURE 1 is a diagrammatic representation illustrating the principles of operation of a digital actuator element employed as an integral component of an electromagnetic positioner according to this invention.

FIGURE 2 is a diagrammatic representation illustrating the arrangement of a four-digital-actuator-element positioner designed in accordance with the concepts of the instant invention.

FIGURE 3 illustrates a longitudinal cross-sectional view for a preferred embodiment of a two-digital-actuator-element positioner designed in accordance with the principles of the instant invention.

FIGURE 1 represents an illustrative model 9 of one of the actuator elements employed in the actuator of an electromagnetic positioner of the instant invention. It can be seen that the single actuator element 9 is comprised of a pair of plunger-type electromagnets 1 and 1' which are arranged in side-by-side fashion so as to selectively control a plunger member 4 which is arranged to be reciprocally moved therebetween. A conventionally movable iron member or armature 5 and 5' is provided for each electromagnet 1 and 1' at the positions illustrated. The two armatures 5 and 5', however, are arranged so as to be stationary relative to their stators 3 and 3' during operation of this device, and further are mechanically interconnected by means of a rod 6 formed of a non-magnetic material so as to form a composite armature assembly. The plunger in the actuator element is mechanically coupled to an output shaft 8 which, in turn, may be the final output shaft for a single stage device, or may be interconnected to the output shaft of a cascaded actuator stage in an embodiment comprised of two or more of such actuator elements. The output rod or shaft 8 is likewise formed from a non-magnetic material.

The dual electromagnetic structure 9 may be regarded as that structure which would be obtained if the projecting stators toward which the plungers are pulled are formed of two ordinary plunger-type electromagnets arranged in side-by-side fashion and were to be replaced with a single plunger means 4 selectively controlled by ten such electromagnets.

Each actuator element incorporates two electromagnets and is provided with two pairs of input terminals $2a$ and $2a'$ for the exciting windings 2 and $2'$ of the associated electromagnets. The direction in which the plunger is pulled is dependent upon which of the pairs of terminals $2a$ or $2a'$ are supplied with an excitation current. In the case where the input excitation signal is a binary ZERO, then an excitation current is applied to input terminal pair $2a'$, causing the plunger 4 to be moved in the right-hand direction, as shown by arrow $4a$ until the right-hand edge of plunger 4 engages the left-hand edge of armature $5'$. In the case where the excitation current input is a binary ONE, the excitation current is applied to the terminal pair $2a$, causing plunger 4 to move in the left-hand direction, as shown by arrow $4b$, until its left-hand edge engages the right-hand edge of armature 5. By appropriately adjusting the distance between the right-hand edge of armature $5'$ and the left-hand edge of armature 5 and the length of plunger 4, the amount of displacement which plunger 4 may undergo can be very simply and accurately controlled. When it is desired to cascade a multiplicity of such actuator elements 9, each displacement distance which the plunger 4 may undergo can be varied accordingly so as to be directly related to the "weighted" value of the input binary information.

The stroke distances of the plungers, each disposed between a set of armatures, may thereby be set generally, but not exclusively, so as to be $2^0, 2^1, 2^2, \ldots 2^{n-1}$, times as great as one unit of displacement, respectively, when considering the positioner mechanism as a train of actuator elements from one (movable) end of the train.

Considering a single positioning mechanism, the armature assembly (or the plunger) of the actuator element at one end thereof and the plunger (or the armature assembly) of the actuator element at the opposite end thereof are respectively taken as the reference and output ends, respectively.

It will be obvious to those skilled in the art that the reference and output ends can be reciprocally reversed, if desired, from an inspection of the mechanical and electromagnetic characteristics of the positioner.

By supplying either a binary ONE or ZERO excitation current which constitutes a binary coded electrical input, to each of the actuator elements in any arbitrary order, or simultaneously, and exciting either winding of each actuator element according to the state of the binary coded electrical input, a digital binary addition substantially instantaneously occurs in the positioner mechanism and the output end thereby substantially instantaneously may assume any one of a number of discrete positions within the range of a full stroke distance.

Since the discrete amounts of displacement are added up digitally by the train of actuator elements connected in cascade, the plunger of any intermediate actuator element not only undergoes movement until it touches the surface of either of its associated armatures, but also displaces in relation to the dual electromagnet structure due to the cascaded connection.

The maximum relative displacement of the armature assembly, as viewed from the output-end actuator element, should be less than the stroke distance of the plunger in the same actuator element by an amount equal to one unit of displacement.

In the region between the armature assembly and the plunger of each actuator, there is provided, in the design of the positioner, a stroke distance of the plunger which is determined by whatever position the element is disposed at in the train of actuator elements.

Accordingly, one of the prerequisites of the instant invention is the proper selection of the axial lengths of the plunger and the two armatures in each actuator element and their relative positions with respect to the dual electromagnet structure, in particular, to the full axial length of the stator cores so that the magnetic reluctances of the magnetic paths in each actuator element or the magnetic pull between the armature assembly and the plunger in each element, may be kept substantially constant irrespective of the aforementioned relative displacement that the armature assembly may take in the full stroke distance.

One very essential feature of the instant invention is the presence of remarkably high operating speeds. This is due to the fact that the structural character of the dual electromagnetic apparatus of each actuator element which is comprised of two windings and two stator cores, remains fixed in position and the only movable parts of the element are restricted to the plunger and armature assembly.

Another essential feature of the instant invention is that the smaller the unit of displacement which is taken, the more the magnetic pull can be increased, and hence, the higher the increase in the operating speed. As a consequence, the power supply for actuating the device can be substantially reduced as to its output requirements, and therefore, a very economical supply may be provided. Thus, the overall size of the electromagnet positioning mechanism in accordance with the instant invention can be designed to be sufficiently compact and yet provide extremely high precision positioning.

Returning to a consideration of the illustrative model for an embodiment of an actuator element in accordance with the instant invention, it can be seen from FIGURE 1 that the plunger 4 is loosely fitted within the central bore of the stator cores 3 and $3'$, and further that the pair of armatures 5 and $5'$ are likewise loosely fitted within the central bore of its associated stator core with the armatures 5 and $5'$ being directly coupled by means of the non-magnetic rod 6.

It should be noted that the extreme right-hand end 7 of rod 6 may be assumed to be connected at some fixed or stationary point $7a$ with the armature assembly 5, $5'$ and 6 taken as a reference end when the actuator element 9 of FIGURE 1 is positioned at the extreme end of a cascaded actuator element train, the actuator element 9 being at the fixed location and the left-handmost actuator element (not shown in FIGURE 1) being the output shaft end. If the actuator element 9 is employed as an intermediate element in a train comprised of a multiplicity of cascaded actuator elements, the rod portion 7 is connected to the plunger of the adjacent actuator element positioned to the right of actuator element 9, and, therefore, the graphic symbol $7a$ should be construed as a semifixed point from which a certain amount of displacement is permitted. In either case, the junction between the rod 8 and the plunger 4, namely the point $8a$, becomes the output reference point of actuator element 9, and the rod 8 extends axially, as shown, for connection with the armature assembly of the actuator element (not shown in FIGURE 1) positioned to the left of actuator element 9.

Considering the structure of FIGURE 1, let it be assumed that plunger 4 has its right-hand edge engaging the left-hand edge of armature $5'$. When an excitation current flows in winding 2, magnetic flux is produced through stator core 3 and armature 5, causing plunger 4 to be pulled toward armature 5 until its left-hand edge engages the right-hand edge of armature 5. Thus, output rod 8 is caused to move in the left-hand direction, as shown by arrow $4b$, by a distance equal to the initial clearance between plunger 4 and armature 5 (i.e., by the initial clearance between plunger 4 and armature 5 when plunger 4 engages armature $5'$).

Conversely, when winding 2 is deenergized and winding $2'$ is energized with an excitation current, plunger 4 is pulled toward armature $5'$ until its right-hand edge engages the left-hand edge of armature $5'$. Accordingly, the output rod 8 is caused to move in the right-hand direction, as shown by arrow $4a$.

In either case, the magnetic pull between plunger 4 and one of the armatures 5 or 5' remains substantially unchanged, irrespective of the displacement of the armature assembly, provided the plunger passes through the clearance between the two stator cores 3 and 3' and the outward ends of armatures 5 and 5' are situated outside of the corresponding outward ends of the stator cores 3 and 3', respectively, in the manner shown in FIGURE 1. It is evident, therefore, that the armature assembly 5, 5', 6 can be mechanically displaced within the aforementioned displacement range in which region the magnetic pull remains substantially constant.

FIGURE 2 is a schematic diagram of a cascaded train 11 comprised of four-actuator-element electromagnetic positioners designed in accordance with the principles of the instant invention. Employing the structure of FIGURE 2, the actuators' final output shaft 46 can assume up to sixteen discrete positions ranging from 0 to 15 units of displacement when a 4-bit binary coded input is supplied at the appropriate input terminals.

As shown in the embodiment 11 of FIGURE 2, the actuator elements 10, 20, 30 and 40 are respectively comprised of plungers 14, 24, 34 and 44 and armature assemblies 15–15', 25–25', 35–35' and 45–45'. The interconnecting rods for the assemblies (i.e. the interconnecting rod 6 shown in FIGURE 1) have been omitted from the embodiment of FIGURE 2 for purposes of simplicity. The plungers 14, 24 and 34 are mechanically connected to the right-hand side armatures 25', 35' and 45', respectively, by non-magnetic rods 16, 26 and 36, respectively. The left-handmost plunger 44 is coupled to a non-magnetic rod 46 which, in a four-actuator-element embodiment, constitutes the output shaft, but which may comprise the connecting shaft to the next actuator element in a positioning mechanism comprised of five or more individual actuator elements. It should, therefore, be obvious that the total number of actuator elements employed in any cascaded train of elements is dependent only upon the needs of the user.

One end of the armature assembly of the extreme right-hand actuator element 10 is fixed in position, as illustrated, with the armature 15' being mechanically coupled to a non-magnetic rod 12 which, in turn, has its opposite end mechanically coupled to fixed position 13. As was previously described, rod 12 may be coupled to the plunger of an actuator element located to the right of actuator element 10, if desired. However, in the four-actuator-element embodiment of FIGURE 2, position 13 acts as the fixed position and the output end 46a of non-magnetic rod 46 serves as the output shaft position.

Terminal pairs $W_1$–$W_4$ are provided for receiving binary ONE excitation current signals for the purpose of energizing the left-hand windings of each actuator element, whereas terminal pairs $\overline{W}_1$–$\overline{W}_4$ receive binary ZERO excitation currents to be applied to the right-hand windings of each actuator element. Whereas the excitation current terminal pairs $W_1$–$W_4$ and $\overline{W}_1$–$\overline{W}_4$ are shown as single terminals, this has only been done for purposes of simplicity and it should be understood that a pair of terminals is provided at each of these locations. Since one of each of such terminal pairs may be grounded, these terminals have thereby been omitted.

Let it now be assumed that the stroke distances $S_1$–$S_4$ of the plungers 14–44, respectively, have been respectively set so as to be 1, 2, 4 and 8 times as great as one arbitrary unit of displacement. Then the maximum displacements $l_1$–$l_4$ of the armature assemblies with respect to the reference locations which have been indicated by dash lines (and which are the positions obtained when binary ZEROS are applied to these actuator elements) will be respectively expressed as 0, 1, 3, and 7 times the one arbitrary unit of displacement.

Since each of the actuator elements of the positioning mechanism 11 can handle a single binary ONE or binary ZERO digit of a binary coded input signal at any given instant of time, plunger 44 of the left-handmost actuator element 40 ultimately develops a digitally added discrete displacement output when a binary coded input signal, which is indicative of the required position, is supplied to the actuator elements of the train. The solid line position of the actuator element indicates the total maximum displacement position.

It can clearly be seen that the maximum total displacement is equal to 15 units of displacement which corresponds to the sum of 1, 2, 4 and 8 units of displacement or stroke distances of the individual plungers.

The opposite extreme output possibility occurs when the output end 46a assumes the minimum total displacement position (i.e. the reference location for output 0), which position is linearly removed from the maximum displacement position by 15 units of linear movement in the right-hand direction relative to the FIGURE 2 position shown. In this case, the overall distance between the output end 46a and the reference end 13 is minimum.

Intermediate discrete positions of the output end between the two extreme output positions set forth above are available by energizing either winding of each of the actuator elements 10–40 in any other suitable manner. Thus, the positioning mechanism 11 permits the output shaft 46 to assume any position corresponding to any one of from 0–15 units of displacement. The output information of digital form which is applied as input information to the actuating mechanism of FIGURE 2 may be derived from any suitable electronic device. For example, four bistable flip-flop stages $FF_1$–$FF_4$ coupled to form a counter or register may be employed as the means for applying the digital information to positioning device 11. Each of the flip-flop stages has two output terminals only one of which is in binary ONE at any given instant, the other terminal being in the opposite or binary ZERO state at that given instant. When coupled to form a counter or register, the states of the output terminals may be determined by placing binary information at the input terminal INP. As an alternative, the flip-flop stages $FF_1$–$FF_4$ may be disconnected from one another and may be arranged to receive independent input signals in simultaneous fashion. Each of the output terminals of the flip-flop stages $FF_1$–$FF_4$ are coupled to the input terminals of the actuator elements 10–40 through suitable amplifiers A so as to provide an excitation current of sufficient magnitude to drive the appropriate electromagnet coils. It should be understood that the flip-flop stages as shown in FIGURE 2 constitute only one possible embodiment for driving the actuator elements, and any other driving means may be substituted therefor dependent only upon the needs of the user.

FIGURE 3 shows a cross-sectional view of another preferred embodiment of the instant invention. The embodiment of FIGURE 3 is a two-element positioning mechanism comprised of actuator elements 50 and 60 which are rigidly and coaxially fitted within the casing bore of casing 70.

The actuator elements 50 and 60 are comprised respectively of plungers 54 and 64 and armature assemblies 55–55' and 65–65', respectively. The connecting rods 56 and 66 are formed of a non-magnetic material such as stainless steel, for example. Rod 66 is mechanically coupled to armatures 65 and 65' and is further mechanically coupled to plunger 54. Pin means P pass through suitable openings in the armatures 55–55', 65–65' and plungers 64 and 54 as well as passing through suitable openings in rods 56, 66 and 67, for the purpose of rigidly mechanically coupling the associated elements.

Rod 66, which interconnects armatures 65 and 65', freely and slidingly passes through the elongated hole 55a in armature 55 in order to be suitably mechanically linked to plunger 54. Rod 56, which interconnects armatures 55 and 55a', freely and slidingly passes through an elongated opening 54a in plunger 54 so as to permit plunger 54 and armature assembly 55–56–55' to experience linear movement independently of one another. Likewise, non-magnetic rod 67 freely and slidingly passes through an elongated opening 65a in armature 65 so as to permit plunger 64 to experience linear movement relative to armature assembly 65–66–65', as well as to allow these elements to move independently of one another.

One end of armature 55' is threaded at 55a' so as to threadedly engage a threaded opening 70a as well as to permit threaded engagement with a threaded opening 90a of a stationary armature 55', thereby serving as an adjustment screw means. The rod 67 of non-magnetic material coupled at its right-hand end through pin means P through plunger 66 is coupled at its left-hand end to output shaft 68 of non-magnetic material, by means of a flange-like member 71. Non-magnetic rod 68 projects through the hole 70b in casing 70. The flange-like member 71 serves both the functions of connecting rods 67 and 68 as well as limiting the axial movement of rods 67 and 68.

Actuator element 50 is provided with excitation windings 52–52', while actuator element 60 is provided with excitation windings 62–62'. The stator cores 53 and 63 of actuator elements 50 and 60, respectively, are rigidly fitted within the casing interior so as to experience no linear motion relative to casing 70.

Energization of winding 52 (or 62) by means of a binary ONE excitation current causes the plunger 54 (or 64) to be pulled toward armature 55 (or 65) until the plunger engages its associated armature. Similarly, plunger 54 (or 64) is urged toward armature 55 (or 65) to engage its associated armature when winding 52' (or 62') is energized.

Therefore, if the stroke distances S5 and S6 of the plungers 54 and 64, respectively, are designed to be equal to one or two times one arbitrary unit of displacement, respectively, then the output shaft 68 can assume any one of four discrete positions ranging from no units up to three units of displacement.

With the embodiment assuming the position as shown in FIGURE 3, it can be seen that the left-handmost windings 52 and 62 have been energized so as to obtain maximum lineal output, which output is equal to three units of lineal displacement. The reference end position 55' of the actuator mechanism can be finely, precisely and easily adjusted by suitably turning the adjustment screw 55' relative to casing 70 and stationary wall 90 so as to accurately control the position of armature 55' both with relation to stationary wall 90 and with relation to casing 70. The adjustable range, however, should be restricted to an interval in which the magnetic reluctances of the magnetic paths of the two electromagnets in each actuator element under excitation remain substantially constant. As was previously described, this condition is obtained when the armature members extend at least slighly beyond the exterior opposing surfaces of their associated stators.

Although it has been assumed in both FIGURES 2 and 3 that the armature assembly in the extreme right-hand actuator element and the plunger in the extreme left-hand actuator element are respectively the reference end and the output end, it is possible to obtain a displacement output from the armature assembly in the extreme right-hand element by fixing the position of the plunger in the extreme left-hand actuator element by some suitable means such as a reference end positioned at the left-hand end of the structure.

If it is desired to obtain an angular shaft position as opposed to a linear output position, this may readily and easily be obtained by pivotally coupling output shaft 68 by a pin means 91 to a shaft 92 which is rigidly coupled at its upper end to a shaft 93 designed to rotate about its longitudinal axis 94. Thus, lineal displacement of shaft 68 may be converted into a shaft angle position. The shaft angle position sensitivity may be amplified by coupling shaft 93 through suitable gear means to a second smaller shaft 95. By appropriate selection of the gear ratio, a maximum angular displacement of a quarter revolution of shaft 93 may thereby be converted to a full revolution of shaft 95, if desired. Thus, it can be seen that it is possible to obtain either linear or angular displacement through the actuating mechanism of the instant invention.

As has been fully described above, the instant invention can be seen to provide novel electromagnetic positioning mechanisms of a unique design which is adapted to receive binary coded input signals and automatically and substantially instantaneously convert the digital information into lineal or angular motion of an output shaft after performing a digital addition so that it can assume a number of discrete positions (either lineal or angular) within a predetermined full stroke distance.

The instant invention thereby provides a great deal of practical utility in recording and reproduction of information or in automatic control systems in which extremely high precision is required, as well as for any other allied applications.

Although there has been described a preferred embodiment of this novel invention, many variations and modifications will now be apparent to those skilled in the art. Therefore, this invention is to be limited, not by the specific disclosure herein, but only by the appended claims.

What is claimed is:

1. A positioning mechanism for substantially instantaneously converting binary input signals into a physical displacement comprising:
   a dual electromagnet structure including a stator having an opening at each end;
   a pair of excitation windings being arranged at spaced intervals within said stator;
   a pair of armatures being positioned at opposite ends of said stator and being free to experience reciprocal motion within an associated opening;
   rigid rod means coupled between said armatures;
   a plunger member positioned in axial alignment with said armatures and being free to undergo reciprocal movement within said stator under selective control of said excitation windings;
   second rigid rod means being coupled to said plunger;
   the distance between said armatures being greater than the length of said plunger thereby providing a predetermined displacement distance for said plunger.

2. The device of claim 1 wherein one of said armatures is rigidly coupled to a fixed position and said physical displacement is taken from said second rod.

3. The device of claim 1 wherein said second rod is rigidly coupled to a fixed position and said physical displacement is taken from one of said armatures.

4. A composite positioning mechanism comprised of a train of devices of the type set forth in claim 1 being arranged in side-by-side fashion;
   the right-hand armature of the right-handmost device being coupled to a fixed position;
   said physical displacement being taken from the plunger of the left-handmost device;
   a third plurality of rigid rods connecting the plunger of each device to at least one armature of the device positioned to its left.

5. A composite positioning mechanism comprised of a train of devices of the type set forth in claim 1 being arranged in side-by-side fashion;
   the left-hand armature of the left-handmost device being coupled to a fixed posiiton;
   said physical displacement being taken from the plunger of the right-handmost device;
   a third plurality of rigid rods connecting the plunger of each device to at least one armature of the device positioned to its left, 6. The device of claim 1 further comprising a shaft mounted to rotate about its longitudinal axis;
   a third rod coupled to and projecting from said shaft in a direction transverse to the shaft longitudinal axis;

means pivotally connecting said third rod to said second rod.

7. The device of claim 1 further comprising a shaft mounted to rotate about its longitudinal axis;
a third rod coupled to and projecting from said shaft in a direction transverse to the shaft longitudinal axis;
means pivotally connecting said third rod to one of said armatures.

8. An electromagnetic positioning mechanism for converting binary-coded electrical input signals into a physical displacement to permit discrete collective physical positions thereof characterized by comprising:
$n$ ($n$ corresponds to the number of bits of the input, being two or more) coaxially disposed digital actuator elements connected in cascade, wherein $n$ is the number of binary bits of information;
each of said elements being comprised essentially of a dual electromagnet structure containing a single plunger positioned between the two electromagnets forming each dual electromagnet structure, and an armature assembly comprised of two armatures disposed on opposite sides of said plunger, and a rigid rod of non-magnetic material for interconnecting said two armatures;
means for mechanically coupling said rod of non-magnetic material connected to said plunger to the armature assembly of the adjacent actuator element;
each of said rigid rods being of predetermined lengths for setting the stroke distances of said plungers between their associated armature assemblies in the train of $n$ actuator elements generally $2^0$ $2^1$, $2^2$ . . . $2^{n-1}$ times, one unit of displacement respectively as viewed from either end of the train;
means for supplying binary input information to each actuator element wherein a binary ONE signal is applied to one of said windings and a binary ZERO is applied to the remaining winding of each of the $n$ actuator elements for carrying out a digital addition;
means coupling the armature assembly in the actuator element at one end of the train and the plunger in the actuator element at the opposite end of the train respectively to a reference point and an output utilization means.

9. An electromagnetic positioning mechanism for converting binary-coded electrical input signals into a physical displacement to permit discrete collective physical positions thereof characterized by comprising:
$n$ ($n$ corresponds to the number of bits of the input, being two or more) coaxially disposed digital actuator elements connected in cascade wherein $n$ is the number of binary bits of information;
each of said elements being comprised essentially of a dual electromagnet structure containing a single plunger positioned between the two electromagnets forming each dual electromagnet structure, and an armature assembly comprised of two armatures disposed on opposite sides of said plunger, and a rigid rod of non-magnetic material for interconnecting said two armatures;
means for mechanically coupling said rod of non-magnetic material connected to said plunger to the armature assembly of the adjacent actuator element;
each of said rigid rods being of predetermined lengths for setting the stroke distances of said plungers between their associated armature assemblies in the train of $n$ actuator elements generally $2^0$, $2^1$, $2^2$ . . . $2^{n-1}$ times, one unit of displacement respectively as viewed from either end of the train;
means for supplying binary input information to each actuator element wherein a binary ONE signal is applied to one of said windings and a binary ZERO is applied to the remaining winding of each of the $n$ actuator elements for carrying out a digital addition;
means coupling the plunger in the actuator element at one end of the train and the armature assembly in the actuator element at the opposite end of the train respectively to a reference point and an output utilization means.

10. The composite positioning mechanism of claim 4 wherein the displacement distances of all of said devices are different from one another.

11. The composite positioning mechanism of claim 10 wherein the displacement distance of each device is twice as great as displacement distance of the device to its left.

12. The composite positioning mechanism of claim 10 wherein the displacement distance of each device is twice as great as displacement distance of the device to its right.

References Cited
UNITED STATES PATENTS

| | | | |
|---|---|---|---|
| 2,972,091 | 2/1961 | Clements | 317—190 |
| 3,153,229 | 10/1964 | Roberts | 310—24 |
| 3,202,886 | 8/1965 | Kramer | 310—14 XR |
| 3,219,854 | 11/1965 | McLaughlin | 310—14 |
| 3,233,749 | 2/1966 | Devol | 318—125 XR |
| 3,268,747 | 8/1966 | Snowdon | 310—13 |

MILTON O. HIRSHFIELD, *Primary Examiner.*

D. F. DUGGAN, *Assistant Examiner.*

U.S. Cl. X.R.

318—22; 310—14, 24; 335—267; 340—347